(12) United States Patent
Craven-Bartle

(10) Patent No.: US 9,389,732 B2
(45) Date of Patent: Jul. 12, 2016

(54) LIGHT COUPLING STRUCTURES FOR OPTICAL TOUCH PANELS

(75) Inventor: Thomas Craven-Bartle, Sodra Sandby (SE)

(73) Assignee: Flatfrog Laboratories AB, Lund (SE)

(*) Notice: Subject to any disclaimer, the term of this patent is extended or adjusted under 35 U.S.C. 154(b) by 51 days.

(21) Appl. No.: 14/343,571

(22) PCT Filed: Sep. 5, 2012

(86) PCT No.: PCT/SE2012/050939
§ 371 (c)(1),
(2), (4) Date: Mar. 7, 2014

(87) PCT Pub. No.: WO2013/036192
PCT Pub. Date: Mar. 14, 2013

(65) Prior Publication Data
US 2014/0253831 A1  Sep. 11, 2014

Related U.S. Application Data

(60) Provisional application No. 61/532,655, filed on Sep. 9, 2011.

(30) Foreign Application Priority Data

Sep. 9, 2011 (SE) .................................. 1150810

(51) Int. Cl.
G06F 3/042 (2006.01)
F21V 8/00 (2006.01)

(52) U.S. Cl.
CPC .............. *G06F 3/0428* (2013.01); *G02B 6/002* (2013.01); *G02B 6/0018* (2013.01); *G02B 6/0028* (2013.01); *G06F 3/0421* (2013.01); *G06F 2203/04109* (2013.01)

(58) Field of Classification Search
CPC combination set(s) only.
See application file for complete search history.

(56) References Cited

U.S. PATENT DOCUMENTS 6,972,753 B1  12/2005  Kimura et al.
7,432,893 B2  10/2008  Ma et al.
(Continued)

FOREIGN PATENT DOCUMENTS

WO  WO-2007/003196 A2  1/2007
WO  WO-2008/017077 A2  2/2008
(Continued)

OTHER PUBLICATIONS

International Search Report dated Feb. 18, 2013 issued in corresponding International Application No. PCT/SE2012/050939.
(Continued)

*Primary Examiner* — Jason Olson
*Assistant Examiner* — Krishna Neupane
(74) *Attorney, Agent, or Firm* — Harness, Dickey & Pierce, P.L.C.

(57) ABSTRACT

A coupling element (14) for use in a touch-sensitive apparatus is arranged to transfer light between an electro-optical device (2) and a panel (4) for light transmission. The electro-optical device (2) is an emitter or a detector and has an operative solid angle given by orthogonal device divergence angles. The coupling element (14) is an optical component with a first light transmission surface (21) for facing the electro-optical device (2), and a second light transmission surface (22) for mounting on the panel (4). The coupling element (14) has an optical structure (23) that directs the light between the first and second light transmission surfaces (21, 22) by one or more reflections while expanding one device divergence angle ($\alpha x$) into a component divergence angle at the second light transmission surface (22). Thereby, the component divergence angle defines a divergence ($\phi p$) in the plane of the panel (4) with respect to light propagating by internal reflections inside the light transmissive panel (4).

23 Claims, 7 Drawing Sheets

(56) References Cited

U.S. PATENT DOCUMENTS

| | | |
|---|---|---|
| 7,435,940 B2 | 10/2008 | Eliasson et al. |
| 7,995,039 B2 | 8/2011 | Eliasson et al. |
| 2003/0095399 A1 | 5/2003 | Grenda et al. |
| 2004/0252091 A1 | 12/2004 | Ma et al. |
| 2006/0114237 A1 | 6/2006 | Crockett et al. |
| 2007/0075648 A1 | 4/2007 | Blythe et al. |
| 2009/0122020 A1 | 5/2009 | Eliasson et al. |
| 2009/0267919 A1 | 10/2009 | Chao et al. |
| 2011/0122094 A1 | 5/2011 | Tsang et al. |
| 2011/0175852 A1* | 7/2011 | Goertz .................... G06F 3/042 345/175 |

FOREIGN PATENT DOCUMENTS

| | | |
|---|---|---|
| WO | WO-2010/056177 A1 | 5/2010 |
| WO | WO-2010/064983 A2 | 6/2010 |
| WO | WO-2011/057572 A1 | 5/2011 |

OTHER PUBLICATIONS

Supplementary European Search Report dated Mar. 13, 2015 issued in corresponding European Application No. 12830234.6.

* cited by examiner

LIGHT COUPLING STRUCTURES FOR OPTICAL TOUCH PANELS

CROSS-REFERENCE TO RELATED APPLICATIONS

This application is a national phase under 35 U.S.C. §371 of PCT International Application No. PCT/SE2012/050939 which has an International filing date of Sep. 5, 2012, which claims priority to Sweden patent application number SE 1150810-8 filed Sep. 9, 2011 and U.S. provisional patent application No. 61/532,655 filed Sep. 9, 2011.

TECHNICAL FIELD

The present invention relates to touch-sensitive systems that operate by light transmission inside light transmissive panels, and in particular to optical solutions for coupling light into and out of such panels.

BACKGROUND ART

The prior art comprises different types of touch-sensitive systems that operate by transmitting light inside a solid light transmissive panel, which defines two parallel boundary surfaces connected by a peripheral edge surface. Specifically, light is injected into the panel so as to propagate by total internal reflection (TIR) between the boundary surfaces. An object that touches one of the boundary surfaces ("the touch surface") causes a change in the propagating light that is detected by one or more light detectors. In one implementation, e.g. as disclosed in WO2008/017077, US2009/267919 and WO2010/056177, light detectors are arranged behind the panel to detect light which scatters off the touching object and escapes the panel via the boundary surface opposite to the touch surface. In another implementation, e.g. as disclosed in WO2007/003196 and U.S. Pat. No. 7,435,940, light detectors are arranged at the periphery of the panel to detect light which scatters off the touching object and is confined within the panel by total internal reflection. In yet another implementation, e.g. as disclosed in U.S. Pat. No. 7,432,893 and WO2010/064983, light detectors are arranged at the periphery of the panel to sense the attenuation of the light transmitted through the panel.

There are different approaches for injecting the light into the panel. It is known in the art to inject light along an elongate portion of the peripheral edge surface. For example, US2006/0114237, U.S. Pat. No. 6,972,753 and US2007/0075648 propose injecting directional light into the panel via the edge surface. Incoupling via the edge surface is simple but requires the edge surface to be highly planar and free of defects, at least if the light source is not attached to the edge surface. It may be undesirable to attach the light source to the edge surface, since this may impose mechanical load on soldering seams between the light source and a connecting substrate such as a PCB (Printed Circuit Board). Defect free edge surfaces may be difficult and/or costly to achieve, especially if the panel is thin and/or manufactured of a comparatively brittle material such as glass. In order to improve the strength of the panel, the edge surface may be provided with a bevel, which may further limit or obscure the incoupling of light. It may also be difficult to optically access the edge surface if the panel is attached to a mounting structure, such as a frame or bracket, and the mounting structure may cause strain in the edge surface, affecting the optical quality of the edge surface and resulting in reduced incoupling performance.

An alternative approach is to inject the light via a coupling element attached to one of the boundary surfaces of the panel to define an incoupling site.

Depending of touch-sensing technique, it may be desirable to inject light into the panel such that the light diverges in the plane of the panel as it propagates away from the incoupling site, to form a so-called "fan beam".

Aforesaid U.S. Pat. No. 7,432,893 proposes incoupling of diverging light from a point source by means of a revolved prism which is attached to the top boundary surface of the panel. The revolved prism is designed to receive the diverging light and refract the incoming light in a direction transverse to the panel to generate reflection angles in the panel that sustain propagation by TIR, while retaining the direction of the incoming light in the plane of the panel. The revolved prism is a bulky component which may add significant weight and size to the touch system. The size of the prism also limits the number and density of the incoupling sites. To reduce weight and cost, the wedge may be made of plastic material. On the other hand, the panel is often made of glass, e.g. to attain required bulk material properties (e.g. index of refraction, transmission, homogeneity, isotropy, durability, stability, etc) and surface evenness of the top and bottom surfaces. The present Applicant has found that the difference in thermal expansion between the plastic material and the glass may cause such a prism to come loose from the panel as a result of temperature variations during operation and storage of the touch system. Even a small or local detachment of the prism may cause a significant decrease in the performance of the system.

The above discussion is equally applicable to techniques for coupling of light out of the panel. The light may be detected by light detectors directly attached to the edge surface, but this may cause the light detectors to also act as mirrors to the light in the panel at certain angles of incidence, potentially causing uncontrolled and undesirable reflections inside the panel. Alternatively, the light detectors may be directly attached to one of the boundary surfaces. In either case, this may lead to mechanical load on soldering seams between the detector and a connecting PCB. Furthermore, light detectors directly attached to the panel may be exposed to ambient light, i.e. light that originates from sources outside of the panel.

The prior art also comprises U.S. Pat. No. 7,995,039.

SUMMARY

It is an objective of the invention to at least partly overcome one or more of the above-identified limitations of the prior art.

Another objective is to provide an optical component that is compact and suited for transferring light between a light transmissive panel and an electro-optical device, such that the optical component when attached to the panel defines a divergence inside the light transmissive panel in a direction parallel to the boundary surfaces of the panel.

Yet another objective is to provide a compact optical component for coupling light from an emitter into a light transmissive panel such that the light diverges while propagating by internal reflections in the panel.

A further objective is to provide a compact optical component for coupling light propagating by internal reflections out of a light transmissive panel onto a detector in an efficient way.

A still further objective is to enable low levels of ambient light on the light sensor.

These and other objectives, which may appear from the description below, are at least partly achieved by way of optical components, an optical system, an optical film and a touch-sensitive apparatus according to the independent claims, embodiments thereof being defined by the dependent claims.

A first aspect of the invention is an optical component for transferring light between an electro-optical device and a light transmissive panel which defines two opposing boundary surfaces, the electro-optical device having an operative solid angle given by first and second device divergence angles in orthogonal first and second device planes. The optical component comprises: a first light transmission surface configured to face the electro-optical device, a second light transmission surface for mounting on one of the boundary surfaces, and a control surface arrangement configured to direct the light between the first and second light transmission surfaces by one or more reflections so as to expand the first device divergence angle into a first component divergence angle at the second light transmission surface, the first component divergence angle being arranged to define, with respect to light propagating by internal reflections in the light transmissive panel, a divergence inside the light transmissive panel in a direction parallel to the boundary surfaces.

The optical component is thus designed to convert a first device divergence angle of the electro-optical device into an expanded divergence angle (denoted first component divergence angle) at the second light transmission surface, which is adapted for mounting on the boundary surface of panel, and also to orient the expanded divergence angle such that it defines a divergence or spread in a direction parallel to the boundary surfaces inside the panel. The expansion and orientation is achieved by means by one or more reflections in the control surface arrangement that directs the light inside the optical component between the first and second light transmission surfaces. In different embodiments, the divergence inside the panel spans at least 100°, 120°, 140°, 160° and 170°. It is to be noted that, at least in certain embodiments, the divergence may exceed 180° inside the panel, if desired.

The optical component is primarily intended to be made of solid light transmissive material, which thus defines the first and second light transmissive surfaces and the light path between the first and second light transmissive surfaces, including the control surface arrangement.

As used herein, "a divergence in a direction parallel to the boundary surfaces" refers to a divergence in the plane of the panel in a direction away from an incoupling/outcoupling site which is defined by the optical component on the panel. If the electro-optical component is a light emitter, the divergence defines the outer limits of the "fan beam" that propagates away from the incoupling site by internal reflections between the boundary surfaces. If the electro-optical component is a light detector, the divergence defines the outer limits of field of view of the light detector inside the panel for receiving light that propagates by internal reflections between the boundary surfaces, as seen through the optical component. In other words, the divergence refers to the apparent spreading of limiting rays away from the optical component as attached to the panel, as seen in a plan view of the panel.

In one application, the optical component is thus used for coupling of light from an electro-optical light emitter into the panel, by the optical component being arranged to operate on the first device divergence angle, which is a beam spread given by the cone of light emitted by the emitter, to fold the emitted light for propagation by internal reflections in the panel, while expanding the beam spread of the transferred light that is emitted from the second light transmissive surface, resulting in an increased beam divergence in a direction parallel to the boundary surfaces inside the panel. Thus, the inventive optical component enables generation of a wider fan beam inside the panel for a given emitter. It thus has the advantage of enabling use of emitters with smaller cones of light. The expansion of the beam spread by reflection(s) in the control surface arrangement also enables a size reduction of the component compared to conventional incoupling elements which, at best, preserve the beam spread of the emitter. This size reduction is, inter alia, enabled by the fact that the angle expansion is caused by reflection(s) in the control surface arrangement which is optically located between first and second light transmissive surface. Thereby, the origin of the expanded beam spread (the control surface arrangement) is located closer to the second light transmissive surface than the origin of the light (the emitter). It is realized that this enables a size reduction of the second light transmissive surface for a given beam spread of the transferred light.

The inventive design will enable an optical component with smaller dimensions compared to prior art solutions, and thereby also lower weight. Furthermore, reducing the extent of the second light transmissive surface, i.e. the surface used for attaching the component to the panel, may result in lower stress in the bond between the component and the panel due to differences in thermal expansion. Thereby, an improved robustness may be achieved, even if the component and the panel are made of different materials.

As noted in the Background section, it may be desirable to arrange the optical component with an air gap between the first light transmission surface and the electro-optical device. However, the use of an air gap results in a step change in index of refraction at the first light transmission surface, which may cause the emitted cone of light to be compressed when it enters the component through the first light transmissive surface. It is realized that the inventive component, by its ability of expanding the first device divergence angle, may be designed to generate a desired beam divergence in the panel even in the presence of an air gap.

Furthermore, since the optical component allows coupling of light into the transmissive panel through the boundary surfaces, it is possible to provide all or part of the edge surface that joins the boundary surfaces of the panel with a coating or surface structure that reduces or prevents light that propagates towards the edge surface inside the panel from being reflected by the edge surface back into the panel. Such reflected light, which may originate from ambient light or from light coupled into the panel, may result in an uncontrolled and undesirable light distribution inside the panel.

In another application, the optical component is used for coupling of light out of the panel onto an electro-optical light detector, by the optical component defining an enlarged field of view at the second light transmissive surface compared to the field of view of the detector. The enlargement of the field of view enables an efficient collection of light from the panel at the detector. It is realized that the above-mentioned advantages and effects of the optical component when used for incoupling of light are equally applicable when it is used for outcoupling of light.

The panel may have any configuration allowing light to propagate by internal reflections inside the panel while allowing the light to interact with one or more objects in contact with at least one of the boundary surfaces. The interaction is achieved when the object locally couples the propagating light out of the panel to be scattered against the object. In certain touch systems, one of the boundary surfaces may be provided with a reflective coating if only the other boundary surface is to be used for touch interaction. The reference to "boundary surfaces" is intended to indicate the surfaces that have the same extent as the front and back pane of the panel, i.e. the surfaces that extend in the larger extension of the panel. Each boundary surface is typically planar, but may be curved. The periphery of the panel is defined by a circumferential edge surface that joins the boundary surfaces. A touch-sensitivity region, also denoted "touch surface", is defined on at least one of the boundary surfaces.

It is to be understood that the second light transmission surface may be configured for mounting on the boundary surface either directly or via a light transmissive spacer.

Generally, both the panel and the optical component (and the spacer, if any) may be made of any material that transmits a sufficient amount of radiation in the relevant wavelength range to permit a sensible measurement of transmitted energy. Such material includes glass, polymethyl methacrylate (PMMA) and polycarbonates (PC). It is to be understood that the panel and the optical component may be composed of different materials, compositions or layers. For example, at least one of the first and second light transmissive surfaces may be provided with a filter coating designed to only pass certain wavelengths, so as to suppress ambient light. Alternatively or additionally, a suitable wavelength filter compound may be dispersed in the bulk material of the optical component.

As used herein, the "operative solid angle" of an electro-optical device refers to a solid angle in which the device operates on light. Thus, an emitter generates light within a specific solid angle, and a light detector detects light within a specific solid angle. The solid angle is typically defined by divergence angles (also denoted first and second device divergence angles) on both sides of a nominal centerline (beam axis) in each of two orthogonal planes (also denoted first and second device planes). The divergence angles may be defined according to any suitable criterion. One commonly used criterion (beam angle criterion) sets the limits of the divergence angle to where the intensity is 50% of the maximum intensity within the solid angle. Another criterion (field angle criterion) sets the limits of the divergence angle to where the intensity is 10% of the maximum intensity within the solid angle. Other criteria are conceivable, but the limits of the divergence angle are normally set at 10-90% of the maximum intensity. Irrespective of criterion, it is used consistently to define all divergence angles of light in the system.

In one embodiment, the control surface arrangement is further configured to convert the second device divergence angle into a second component divergence angle at the second light transmission surface, the second component divergence angle defining a confined range of angles of incidence inside the light transmissive panel with respect to the boundary surfaces. Thus, the control surface arrangement operates to orient and possibly re-scale the second device divergence angle to form the second component divergence angle such that it matches the confined range of angles of incidence inside the panel. Thus, the second component divergence angle may be equal to, or larger/smaller than, the second device divergence angle.

When the optical component is used for incoupling, it may ensure that all or a desired portion of the light generated by the emitter is transferred into the panel with a direction that matches a desired range of angles of incidence, also denoted reflection angles, against the boundary surfaces.

When the optical component is used for outcoupling, it may ensure that the detector only receives light within the desired range of angles of incidence. In other words, the combination of optical component and light detector will provide an angular selectivity or an angular filter to light rays in the transverse direction of the panel, i.e. perpendicular to the boundary surfaces. Such an angular selectivity may reduce the amount of ambient light that reaches the detector, since the ambient light generally is distributed over a large range of angles, even ambient light that enters the panel via contaminations on the boundary surfaces and then propagates inside the panel by internal reflections.

In one embodiment, the confined range of angles of incidence inside the light transmissive panel extends from a minimum angle to a maximum angle, which are given relative to a normal of the boundary surfaces, and wherein the minimum angle is in the approximate range of 42°-54° and the maximum angle is in the approximate range of 56°-85°. The minimum angle may be selected to exceed a critical angle for total internal reflection inside the light transmissive panel. Since the critical angle depends on the transition in index of reflection at each boundary surface, it is realized that the critical angle and thus the minimum angle may be significantly larger if, e.g., one of the boundary surfaces is defined by an interface between two material layers. The minimum and maximum angles may also be selected to optimize the interaction between the light and the touching objects, which may differ between different types of touching objects, such as animate and inanimate objects.

In one embodiment, the panel has a first index of refraction and the optical component has a second index of refraction that exceeds the first index of refraction. Since light is refracted away from the normal at transition from a higher to a lower index of refraction, such a difference in index of refraction will cause the second component divergence to be refracted towards larger angles of incidence inside the panel. Thereby, the difference in index of refraction may allow a larger second component divergence angle to fit within a given range of angles of incidence inside the panel.

The first component divergence angle may be seen to represent a divergence in an azimuth angle with respect to the second light transmissive surface, and the second component divergence angle may be seen to represent a divergence in an elevation angle with respect to the second light transmissive surface. With this definition, one embodiment of the optical component may be designed to provide essentially the same second component divergence angle for all azimuth angles within the first component divergence angle. This will allow the touching object(s) to be illuminated in approximately the same way (same confined range of angles of incidence inside the panel with respect to the boundary surfaces) at all locations on the touch surface and thereby ensure a consistent interaction (touch sensitivity) between the light and touching object(s) across the touch surface. It will also enable a uniform touch sensitivity within the field of view inside the panel when the optical component is used for outcoupling.

In one embodiment, the control surface arrangement comprises a three-dimensional control surface which is configured to reflect the light and which comprises a first and a second two-dimensional shape feature that at least partly defines the first and second component divergence angle, respectively. The three-dimensional control surface may be configured to reflect the light by either total internal reflection or by means of a reflective coating applied to the outside of the optical component, or a combination thereof.

By using separate shape features for defining the first and second component divergence angles, it is possible to optimize each of these component divergence angles independent of each other when designing the optical component. The two-dimensional shape features may be seen as mutually independent shape elements of the three-dimensional control surface, where each shape feature is defined by a separate set of design parameters.

In one embodiment, the optical component is an elongated light guide which is configured to taper in a direction from the first light transmission surface towards the second light transmission surface in a first geometric plane, and which has a given inclination between a center line of the light guide and the second light transmissive surface in a second geometric plane orthogonal to the first geometric plane. The taper corresponds to the first shape-feature and will serve to increase the divergence of light that enters the light guide to propagate by one or more reflections between opposing control surfaces that converge to the propagating light. Further, the inclination between the center line and the second light transmissive surface corresponds to the second shape feature and will serve to orient the incoming light with respect to the boundary surfaces, so as to match a confined range of angles of incidence with respect to the boundary surfaces. The light guide may also be designed with a taper towards or away from the second light transmissive surface in the second geometric plane, in order to increase or decrease the divergence of the light in the second geometric plane, as desired. The light guide may have a rectangular or elliptical cross-section. It is realized that by aligning the first and second geometric planes with the first and second device planes of the electro-optical device, the light guide will serve to generate desired first and second component divergence angles at the second light transmissive surface.

In another embodiment, the first two-dimensional shape feature is a peripheral curvature in a first geometric plane and the second two-dimensional shape feature is an inclination with respect to a second geometric plane orthogonal to the first geometric plane. Thereby, the peripheral curvature of the three-dimensional control surface controls the angular expansion to generate the first component divergence angle, and the inclination controls the orientation of the light to generate the second component divergence angle. Such an embodiment has the ability of being designed to yield a desired illumination of the boundary surfaces, in terms of the divergence in the plane of the panel and the range of reflection angles inside the panel, by separately optimizing the peripheral curvature and the inclination with respect to the operative solid angle of the electro-optical device and the configuration of the panel.

In one embodiment, the three-dimensional control surface further comprises a curvature in a third geometric plane orthogonal to the first and second geometric planes. This curvature may be of any shape that is optimized or suitable to control the extent of the second component divergence angle (i.e. the range of reflection angles inside the panel) or to achieve a desired light distribution within the second component divergence angle. For example, the curvature may be designed to expand or compress the second component divergence angle in relation to the second device divergence angle.

In one embodiment, the first geometric plane is parallel to the second light transmission surface.

In one embodiment, the control surface has an extent in a projection direction away from the second light transmission surface, and wherein the peripheral curvature is essentially invariant in the projection direction. This means that the shape of the peripheral curvature is essentially the same along the control surface in the projection direction.

In one embodiment, the peripheral curvature is part of an ellipse. As used herein, an "ellipse" is intended to also comprise a circle. In such an embodiment, the first device divergence angle may have a point of origin which is given an optical placement relative to a focal point of the ellipse to generate the first component divergence angle. In other words, the optical component is designed with respect to a specific placement of the electro-optical device to achieve the desired angular expansion.

The foregoing embodiments with a peripheral curvature and an inclination may be implemented by an optical component in which the control surface arrangement is based on a cone defined by a directrix generating a base, a vertex and a generatrix generating a lateral surface, wherein the second light transmission surface is formed by at least part of the base, and the three-dimensional control surface is formed by at least part of the lateral surface. As is well-known in the field of geometry, the directrix is the perimeter of the base of a cone, the vertex is the tip of the cone, and the generatrix represents the line segments between the directrix and the vertex along the lateral surface of the cone.

In one embodiment, the control surface arrangement further comprises a conic section formed in the lateral surface to extend parallel to the base. The conic section is thus formed on the opposite side of the second light transmissive surface and may serve as a pick-up surface to use by an automatic or manually operated tool for gripping the optical component for mounting it on the panel.

In one embodiment, the conic section is provided with a reflective coating. This has been found to increase the effeciency of the electro-optical device, if the electro-optical device is arranged such that part of the light in the second device plane is reflected in the conic section.

A second aspect of the invention is an optical component for coupling light into a light transmissive panel which defines two opposing boundary surfaces, wherein the optical component comprises: a light exit surface for mounting on one of the boundary surfaces; a light entry surface for receiving diverging light with an angular distribution; and an optical structure configured to expand the angular distribution of the diverging light while redirecting the diverging light from the light entry surface to the light exit surface such that the thus-expanded angular distribution defines a divergence in a direction parallel to the boundary surfaces of light that enters the light transmissive panel via the light exit surface for propagation by internal reflections between the opposing boundary surfaces.

In one embodiment, the optical structure is further configured to convert the angular distribution of the diverging light so as to define a confined range of angles of incidence inside the light transmissive panel with respect to the boundary surfaces.

The optical structure is defined by a first shape feature that controls the ability of the optical structure to expand the angular distribution, and a second shape feature that controls, independently of the first shape feature, the ability of the optical structure to convert the angular distribution. This may facilitate the task of designing the optical component with respect to the diverging light since the expansion of the angular distribution (with respect to the divergence inside the panel) may be set independently of the conversion of the angular distribution (with respect to the angles of incidence inside the panel) by separate optimization of the first and second shape features.

A third aspect of the invention is an optical component for coupling light out of a light transmissive panel which defines two opposing boundary surfaces and directing the light onto a light detector having an operative solid angle given by first and second device divergence angles in orthogonal first and second device planes, wherein the optical component comprises: a light entry surface for mounting on one of the boundary surfaces; a light exit surface configured to face the light detector; and an optical structure configured to expand the first device divergence angle into a first component divergence angle at the light entry surface, the first component divergence angle being arranged to define, with respect to light propagating by internal reflections inside the light transmissive panel, a divergent field of view inside the light transmissive panel in a direction parallel to the boundary surfaces.

In one embodiment, the optical structure is further configured to convert the second device divergence angle into a second component divergence angle at the light entry surface, the second component divergence angle being arranged to define a confined range of angles of incidence inside the light transmissive panel with respect to the boundary surfaces.

Like in the second aspect, the optical structure may be defined by first and second shape features that can be independently optimized.

A fourth aspect of the invention is an optical component for transferring light between an electro-optical device and a light transmissive panel which defines two opposing boundary surfaces, wherein the optical component comprises a light transmissive surface and a control surface arrangement which is based on a cone defined by a directrix generating a base, a vertex and a generatrix generating a lateral surface, wherein the optical component is operable to transfer light by mounting the base to one of the boundary surfaces and arranging the electro-optical device to face the light transmissive surface, such that the light is transferred through the optical component by at least one internal reflection in the lateral surface.

In one embodiment, the directrix is configured such that, when the base is mounted to the light transmissive panel, a first device divergence angle of the electro-optical device in a first device plane parallel to the base corresponds to a divergence inside the light transmissive panel in a direction parallel to the boundary surfaces.

In one embodiment, the divergence inside the light transmissive panel is larger than the first device divergence angle.

In one embodiment, the generatrix is configured such that, when the base is mounted to the light transmissive panel, a second device divergence angle of the electro-optical device in a second device plane perpendicular to the first device plane corresponds to a confined range of angles of incidence inside the light transmissive panel with respect to the boundary surfaces.

In one embodiment, the electro-optical device is a light source, and the optical component is configured to couple light emitted by the light source into the light transmissive panel for propagation by internal reflections inside the light transmissive panel.

In another embodiment, the electro-optical device is a light detector, and the optical component is configured to couple light propagating by internal reflections inside the light transmissive panel out of the light transmissive panel for receipt by the light detector.

A fifth aspect of the invention is an optical system comprising: a light transmissive panel which defines two opposing boundary surfaces; an electro-optical device having an operative solid angle given by first and second device divergence angles in orthogonal first and second device planes; and an optical component for transferring light between the electro-optical device and the light transmissive panel, wherein the optical component comprises a first light transmission surface facing the electro-optical device, a second light transmission surface arranged on one of the boundary surfaces, and a control surface arrangement configured to direct the light between the first and second light transmission surfaces by one or more reflections so as to expand the first device divergence angle into a first component divergence angle at the second light transmission surface, the first component divergence angle being arranged to define, with respect to light propagating by internal reflections inside the light transmissive panel, a divergence inside the light transmissive panel in a direction parallel to the boundary surfaces.

In one embodiment, the optical component is attached to the light transmissive panel.

In one embodiment, the optical component is integrated with the light transmissive panel.

A sixth aspect of the invention is an optical film for transferring light between one or more electro-optical devices and a light transmissive panel which defines two opposing boundary surfaces, each electro-optical device having an operative solid angle given by first and second device divergence angles in orthogonal first and second device planes, wherein the optical film is adapted for attachment to one of the boundary surfaces and comprises a micro-structured surface portion that implements at least one optical component according to any one of the first to fourth aspects.

A seventh aspect of the invention is a touch-sensitive apparatus, comprising: a light transmissive panel which defines two opposing boundary surfaces; an illumination arrangement configured to couple light into the panel such that the light propagates by total internal reflection in at least one of the boundary surfaces and such that an object touching said at least one of the boundary surfaces causes a change in the propagating light; a detection arrangement comprising a light detector arranged to detect said change in the propagating light; wherein at least one of the illumination arrangement and the detection arrangement comprises at least one electro-optical device having an operative solid angle given by first and second device divergence angles in orthogonal first and second device planes, and at least one optical component of any one of the first to fourth aspects.

Any one of the above-identified embodiments of the first aspect may be adapted and implemented as an embodiment of any one of the above-identified second to fourth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
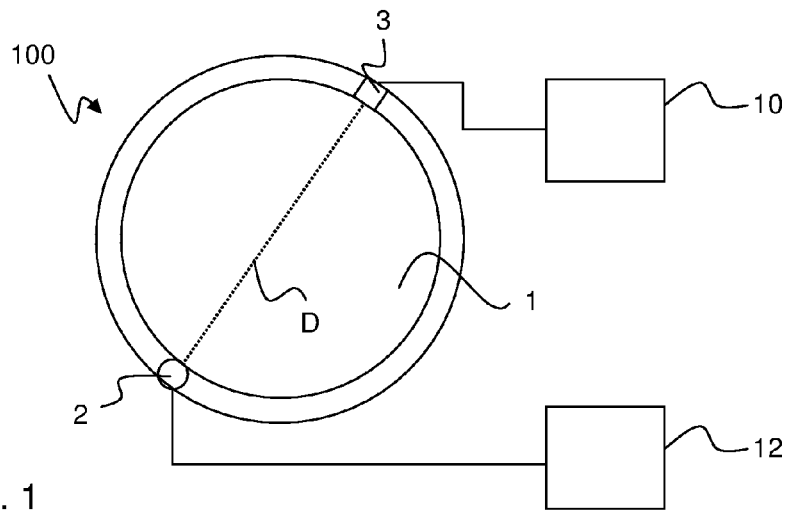
FIG. 1 is a plan view of a touch-sensitive apparatus.

The present invention relates to optical components ("coupling elements") for coupling light into and out of light transmissive panels in touch-sensitive systems. The description starts out by presenting an example of a touch-sensitive system, especially an apparatus operating by frustrated total internal reflection (FTIR) of light. The description continues to present different embodiments of coupling elements for use in such an apparatus.

Throughout the description, the same reference numerals are used to identify corresponding elements.

FIG. 1 illustrates a touch-sensitive apparatus 100 which is based on the concept of transmitting energy across a touch surface 1, such that an object that is brought into close vicinity of, or in contact with, the touch surface 1 causes a local decrease in the transmitted energy. As will be explained in more detail below, the apparatus 100 is configured to permit transmission of energy in the form of light that propagates by internal reflections inside a light transmissive panel.

The touch-sensitive apparatus 100 includes an arrangement of emitters and detectors, which are distributed along the periphery of the touch surface 1. Each pair of an emitter and a detector defines a detection line, which corresponds to the propagation path for a transmitted signal from the emitter to the detector. In FIG. 1, only one such detection line D is illustrated to extend from emitter 2 to detector 3, although it should be understood that the arrangement typically defines a dense grid of intersecting detection lines, each corresponding to a signal being emitted by an emitter and detected by a detector. Any object that touches the touch surface along the extent of the detection line D will thus decrease its energy, as measured by the detector 3.

The arrangement of detectors 3 is electrically connected to a signal processor 10, which samples and processes an output signal from the arrangement. The output signal is indicative of the received power at each detector 3. The signal processor 10 may be configured to process the output signal for extraction of touch data, such as a position (e.g. x, y coordinates), a shape or an area of each touching object.

Generally, the touch surface 1 may be of any shape, such as circular, elliptical or polygonal, including rectangular. The apparatus 100 may be used as an overlay to a display device or monitor, as is well-known in the art.

In the example of FIG. 1, the apparatus 100 also includes a controller 12 which is connected to selectively control the activation of the emitters 2 and, possibly, the readout of data from the detectors 3. The signal processor 10 and the controller 12 may be configured as separate units, or they may be incorporated in a single unit. One or both of the signal processor 10 and the controller 12 may be at least partially implemented by software executed by a processing unit.

Figure 2A:
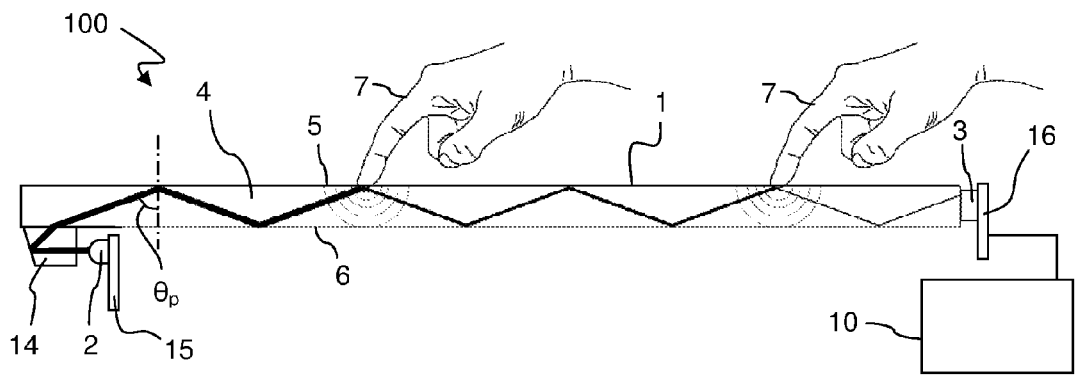
FIGS. 2A-2B are side and top plan views of a touch-sensitive apparatus operating by frustrated total internal reflection (FTIR).

In the following, an example embodiment will be described in more detail. FIG. 2A is a side view of a touch-sensitive apparatus 100 which includes a light transmissive panel 4, a set of light emitters 2 (one shown) and a set of light detectors 3 (one shown). The panel 4 defines two opposing and generally parallel boundary surfaces 5, 6 and may be planar or curved. A radiation propagation channel is provided between the boundary surfaces 5, 6, wherein at least one of the boundary surfaces allows the propagating light to interact with a touching object 7. Typically, the light from the emitter(s) 2 propagates by total internal reflection (TIR) in the radiation propagation channel. The detectors 3 are arranged to receive the propagating light and generate a respective measurement signal which is indicative of the power (or equivalently, energy or intensity) of received light.

In FIG. 2A, light is coupled into the panel 4 via an incoupling element 14 attached to the bottom surface 6, and the light is coupled out of the panel to impinge on the detector 3 at the edge portion that connects the top and bottom surfaces 5, 6 of the panel 4. When the object 7 is brought sufficiently close to the boundary surface, part of the light may be scattered by the object 7, part of the light may be absorbed by the object 7, and part of the light may continue to propagate by TIR in its original direction in the panel 4. Thus, when the object 7 touches a boundary surface of the panel (e.g. the top surface 5), the total internal reflection is frustrated and the energy of the transmitted light is decreased. This type of touch-sensitive apparatus is denoted "FTIR system" (FTIR—Frustrated Total Internal Reflection) in the following.

Figure 2B:
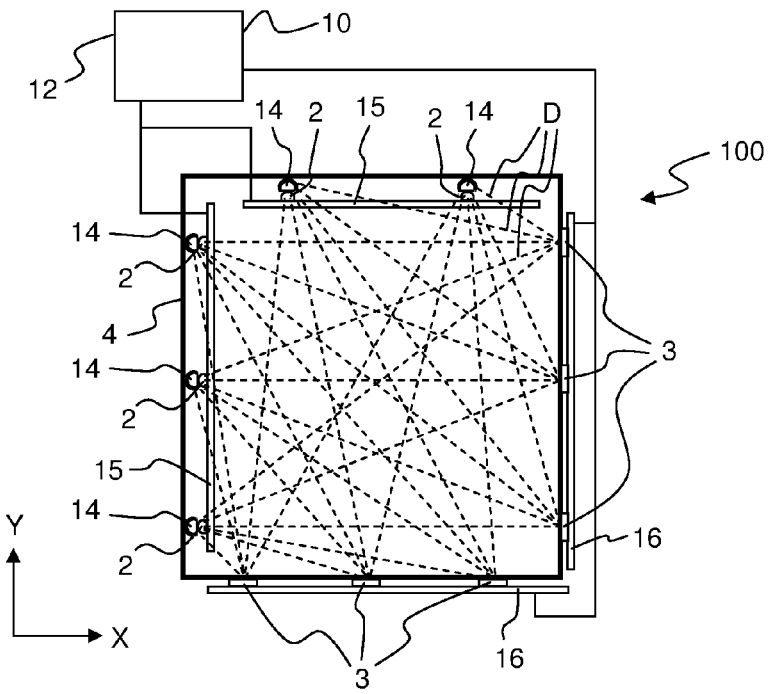

The FTIR system 100 may be operated to measure the power of the light transmitted through the panel 4 on a plurality of detection lines. This may, e.g., be done by activating a set of spaced-apart emitters 2 to generate a corresponding number of light beams inside the panel 4, and by operating a set of detectors 3 to measure the transmitted power of each light beam. Such an embodiment is illustrated in FIG. 2B, where each emitter 2 generates a beam of light that expands in the plane of the panel 4 while propagating away from the emitter 2. Such a beam is denoted a "fan beam" herein. Thus, each fan beam diverges from an entry or incoupling site, as seen on a top plan view. Arrays of light detectors 3 are located around the perimeter of the panel 4 to receive the light from the emitters 2 at a number of spaced-apart outcoupling sites on the panel 4.

As used herein, each emitter 2 may be any type of device capable of emitting divergent radiation in a desired wavelength range, for example a diode laser, a VCSEL (vertical-cavity surface-emitting laser), an LED (light-emitting diode), an incandescent lamp, a halogen lamp, etc. The emitter may also be formed by the end of an optical fiber. Analogously, the detector 3 may be any device capable of converting light into an electrical signal, such as a photo-detector, a CCD device, a CMOS device, etc.

In the example of FIG. 2, the emitters 2 are attached to PCBs 15 which are designed to supply power and transmit control signals to the individual emitters 2, as is well-known in the art. Likewise, the detectors 3 are attached to PCBs 16 which are designed to supply power and transmit measurement data from the individual detectors 3. The PCBs 15, the emitters 2 and the incoupling elements 14 form an illumination arrangement for illuminating the boundary surfaces 5, 6 from within the panel 4. The PCBs 16 and the detectors 3 form a light detection arrangement for detecting the transmitted power of light on the different detection lines D.

Figure 3:
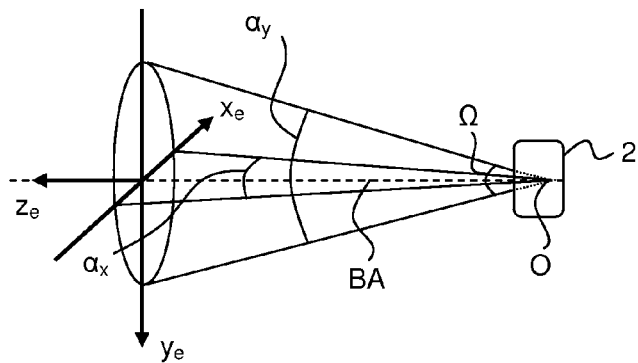
FIG. 3 is a perspective view to illustrate optical parameters of an electro-optical device.

The following description will now focus on the design of the incoupling elements 14. To facilitate the understanding of the design and functionality of the incoupling element 14, FIG. 3 illustrates the operative solid angle Ω of an emitter 2 given by the cone of light generated by the emitter. The cone of light has a point of origin O and is emitted with respect to a centerline, known as beam axis BA, which defines a main direction $z_e$. The cone of light may be defined by a divergence angle in each of two mutually orthogonal planes ("device planes"), which are orthogonal to the beam axis BA. In FIG. 3, these device planes are given by the $x_e$-$z_e$-plane and the $y_e$-$z_e$-plane. In the following, the divergence angle in the $x_e$-$z_e$-plane is denoted $\alpha_x$, and the divergence angle in the $y_e$-$z_e$-plane is denoted $\alpha_y$. These divergence angles are also denoted "device divergence angles" or "device angles". It should be understood that the device planes may have any orientation in the $x_e$-$y_e$-plane and they may, but need not, coincide with the symmetry planes normally used for characterizing the emission of light sources, e.g. in polar diagrams.

Figure 4A:
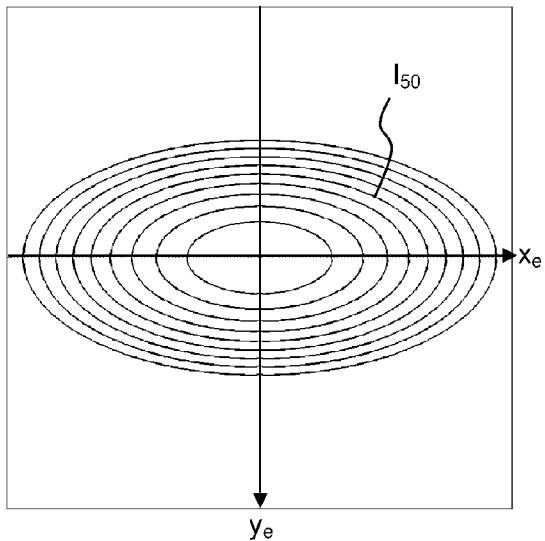
FIGS. 4A-4B are contour plots of light intensity distributions for different light emitters.
Figure 4B:
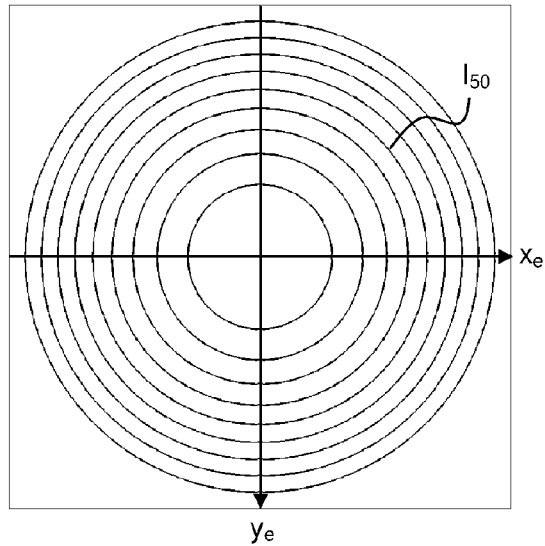

FIGS. 4A-4B are plots of two exemplifying illumination patterns for two different types of Light Emitting Diodes (LEDs), as measured in the $x_e$-$y_e$-plane of FIG. 3. The plots are represented as iso-intensity curves, which indicate a decreasing intensity away from the center (beam axis BA). The light distribution is asymmetric in FIG. 4A and symmetric in FIG. 4B. Each type of light emitter has a nominal illumination pattern, as well as nominal divergence angles $\alpha_x$, $\alpha_y$. The nominal divergence angles $\alpha_x$, $\alpha_y$ are defined as the angle included between maximum angles on both sides of the beam axis BA. In the following, the maximum angles are set to where the intensity has decreased to 50% of the maximum intensity. The corresponding intensity curve is indicated by $I_{50}$ in FIGS. 4A-4B. A typical LED has nominal divergence angles $\alpha_x$, $\alpha_y$ in the range of 10°-120°. For comparison, a Lambertian source has nominal divergence angles $\alpha_x = \alpha_y = 120°$ (i.e., $2 \cdot \cos^{-1}(0.5)$). The type of criterion used for defining the divergence angles is not essential for the invention. However, given that the incoupling element 14 achieves a certain divergence in the plane of the panel ($\phi_p$, below), a stricter criterion (e.g. with the maximum angles set at a higher percentage of the maximum intensity) generally results in a more uniform distribution of light in the panel 4.

The incoupling element 14 operates on the cone of light, or part thereof, to direct the light into the panel 4 such that it propagates by internal reflections between the boundary surfaces 5, 6. This operation is schematically indicated in FIG. 2A, albeit only for a center ray (corresponding to an "optical axis" of the incoupling element 14). Thus, the incoupling element 14 is designed such that light propagating on the optical axis is re-directed and injected into the panel with a nominal angle of incidence $\theta_p$ (also denoted "nominal reflection angle" or "nominal bounce angle" herein) to the normal of the boundary surfaces 5, 6. In order to sustain total internal reflection (TIR), the reflection angle should not be less than the critical angle at each boundary surface 5, 6 that should reflect light by TIR. The critical angle is given by Snell's law and is well-known to the skilled person.

Figure 5:
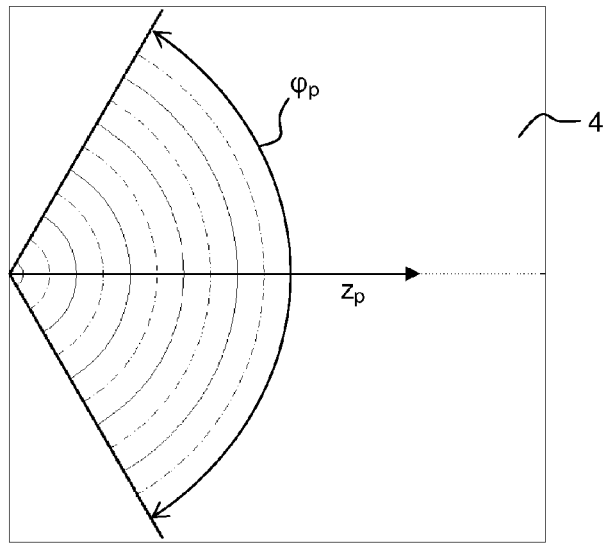
FIG. 5 is a top plan view of the light intensity distribution in a panel as generated by a coupling element according to a first embodiment.

The incoupling element 14 also operates on the cone of light, or part thereof, to direct the light into the panel 4 such that it forms a fan beam with a given divergence $\phi_p$ in the plane of the panel 4. FIG. 5 is a top plan view of such a fan beam, where the solid and dashed arcs indicate the locations, given for the nominal reflection angle $\theta_p$, where the beam hits the upper and lower boundary surfaces 5, 6, respectively. Also indicated is the main direction $z_p$ of the propagating fan beam in the plane of the panel 4. In FIG. 5, the arcs are mutually parallel, which means that the incoupling element 14 generates essentially the same nominal reflection angle $\theta_p$ for all angles within the divergence $\phi_p$. However, in other embodiments, the nominal reflection angle $\theta_p$ may vary within the divergence $\phi_p$.

Figure 6:
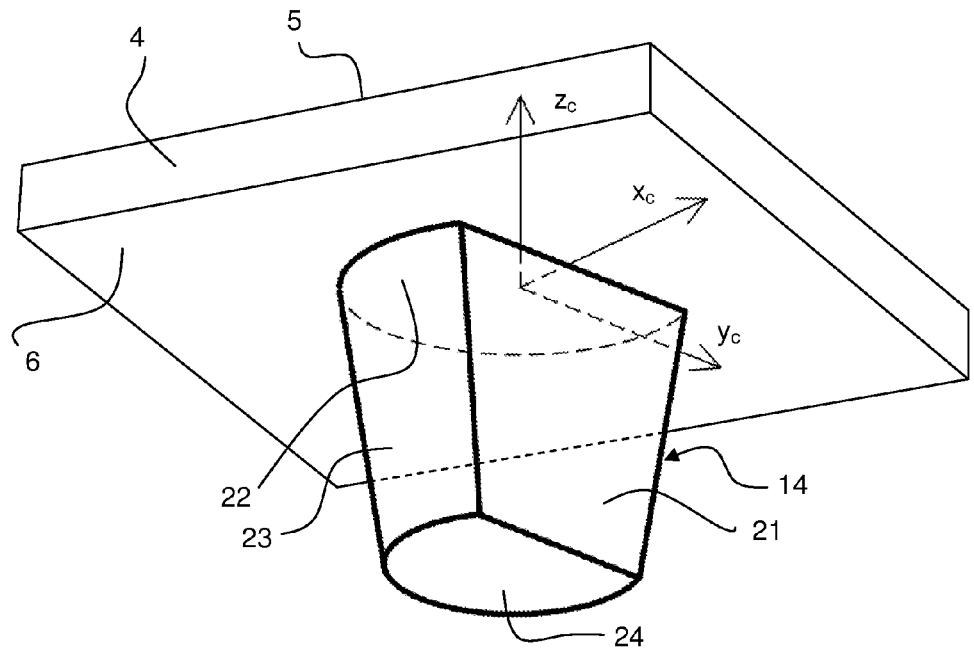
FIG. 6 is a perspective view of a coupling element according to the first embodiment, as attached to a panel.

FIG. 6 is a perspective view of a first embodiment of the incoupling element 14 as attached to the bottom boundary surface 6 of the panel 4, e.g. by means of an optical adhesive. The incoupling element 14 is made of an optically transparent material and comprises a planar light entry face 21 arranged to project from the panel 4, a planar light exit face or attachment surface 22 arranged to face and be affixed to the boundary surface 6, and a three-dimensional control surface 23 which is designed with respect to the solid angle Ω (FIG. 3) of the emitter 2 so as to achieve the desired panel divergence $\phi_p$, main direction $z_p$ and bounce angle $\theta_p$ of the injected light. A coordinate system is defined at the center of the exit face, with $z_c$ extending normal to the exit face, and $x_c$ extending parallel to the main direction ($z_p$) of the light coupled into the panel 4.

Figure 7:
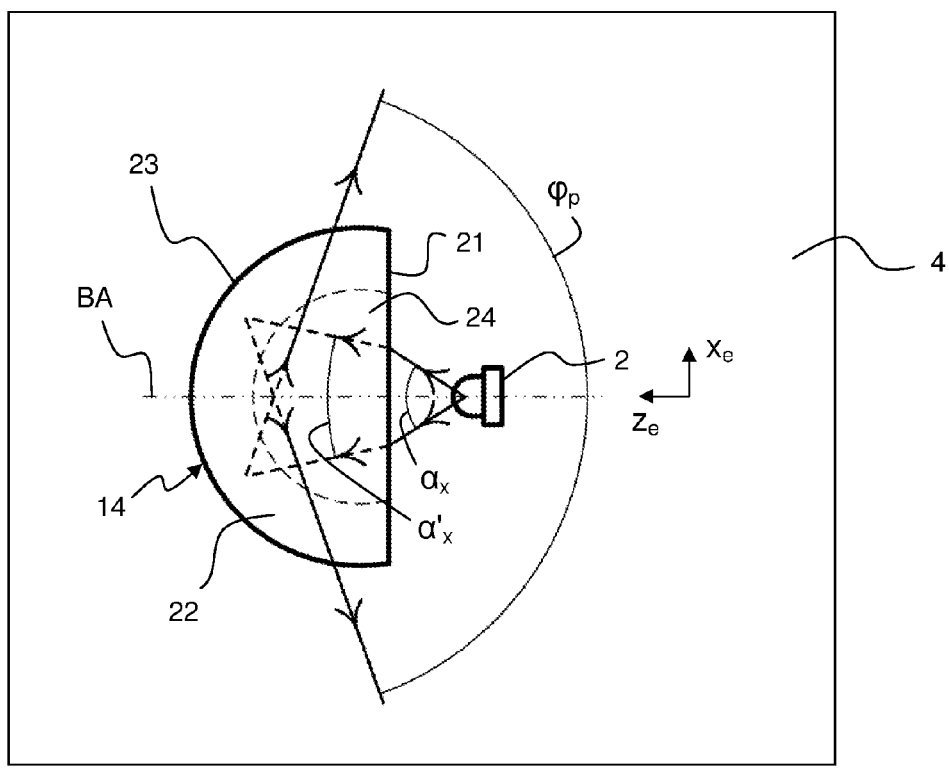
FIG. 7 is a top plan view of the coupling element in FIG. 6.

FIG. 7 is a top plan view of the first embodiment as attached to the panel 4 and combined with an emitter 2. FIG. 7 illustrate defining light paths from the emitter 2 through the incoupling element 14 and into the panel 4. The emitter 2 generates a cone of light with a device angle $\alpha_x$. As the light enters the solid element 14 via the entry face 21, the cone of light is compressed, i.e. the divergence is decreased (indicated by $\alpha'_x$), as a result of the light entering a medium of higher index of refraction. It can in fact be shown that, for a planar entry face 21, the divergence after entry cannot exceed twice the critical angle at the entry face 21. For example, if the incoupling element 14 has an index of refraction of 1.6, the maximum divergence after entry is approximately 77°. The cone of light then hits the control surface 23, which reflects the cone so as to redirect it and expand its divergence significantly with respect to the device angle $\alpha_x$. The reflected cone has a component divergence $\phi_c$ (not indicated), which in turn controls the panel divergence $\phi_p$ inside the panel (typically $\phi_p = \phi_c$).

It is understood that the shape ("peripheral curvature") of the control surface 23 in FIG. 7, i.e. as seen in a first geometric plane parallel to the exit face 22, defines the component divergence $\phi_c$. In the illustrated embodiment, the shape is elliptical. As used herein, "elliptical" is intended to also include "circular". It is to be understood that other shapes may be used to attain a desired distribution of light in the panel 4. The elliptical shape of the control surface 23 may optimize the performance of the coupling element 14, whereas the use of a circular shape may simplify design, modeling and manufacture of the coupling element 14. Although the control of the component divergence $\phi_c$ via the shape of the control surface 23 is essentially independent of the control of the nominal reflection angle $\theta_c$ via the inclination of the control surface 23 (see below), a small interdependence remains which may lead to a slight aberration of the light leaving the coupling element 14. It is possible to design the control surface 23 with a varying shape in the transverse direction, i.e. such that the shape of the control surface differs in cross-sections taken through the coupling element 14 at different distances from the exit face 22, to reduce this aberration and/or other artifacts.

Figure 8:
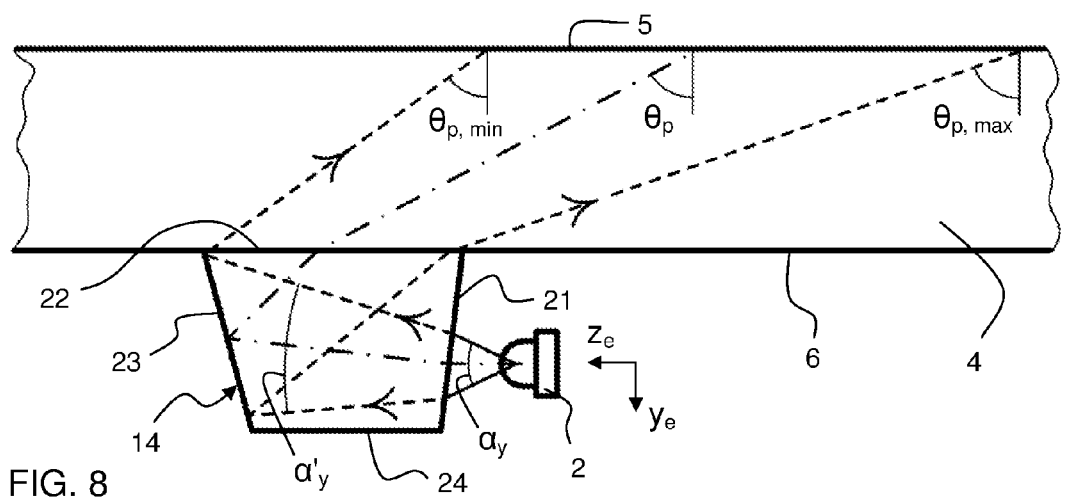
FIG. 8 is a section view of the coupling element in FIG. 7.

FIG. 8 is a section view along the beam axis BA in FIG. 7, to illustrate how the generated cone of light is transferred through the incoupling element 14 in the transverse direction of the panel 4. In the illustrated example, the light on the beam axis is reflected in the control surface 23 to form the nominal reflection angle $\theta_p$ at the boundary surface 5. For the same reason as in FIG. 7, the cone of light is compressed on entry through the entry face (going from $\alpha_y$ to $\alpha'_y$), whereupon the limiting rays hit the inclined control surface 23 to be reflected into the panel 4, in which they define a minimum and a maximum reflection angle $\theta_{p,min}$, $\theta_{p,max}$, respectively. In the illustrated embodiment, the device divergence $\alpha_y$ is redirected by the inclination of the control surface 23 (and the compression), so as to form a desired range of reflection angles ($\Delta\theta_p=\theta_{p,max}-\theta_{p,min}$) inside the panel 4. In the illustrated embodiment, the entire cone of light emitted by emitter 2 is re-shaped and re-directed into the range of reflection angles ($\Delta\theta_p$). However, it is conceivable that the emitted cone of light expands beyond the entry face 21 and/or the compressed cone of light expands beyond the control surface 23.

Figure 9:
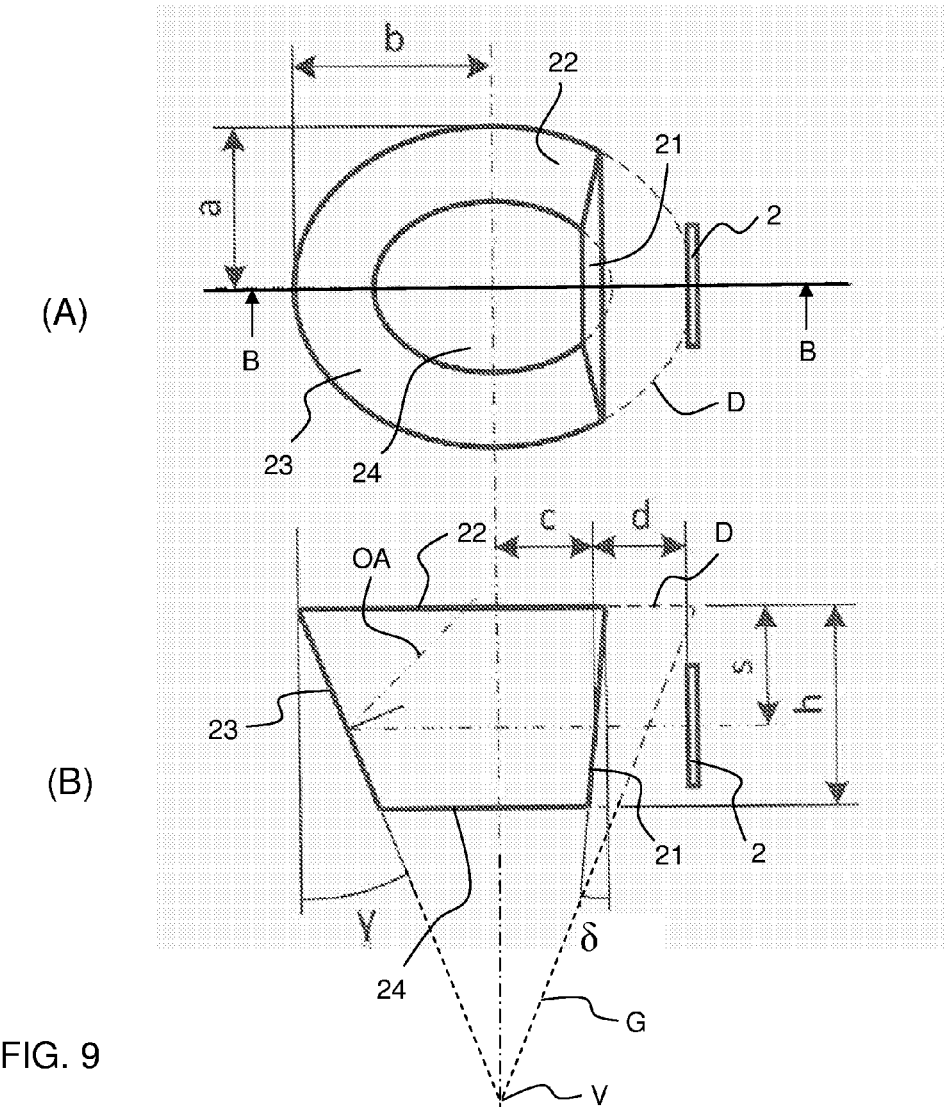
FIGS. 9A-9B are top plan and side views to illustrate design parameters of a coupling element according to the first embodiment.

Thus, as indicated in FIG. 9B, the control surface 23 is inclined by an angle $\gamma$ with respect to a second geometric plane that is orthogonal to the above-mentioned first geometric plane. In the example of FIG. 8 and FIG. 9B, the control surface 23 is planar in a third geometric plane, which is orthogonal to the above-mentioned first and second geometric planes and which coincides with the plane of the paper in FIG. 8 and FIG. 9B. In another example, the control surface 23 is curved in the third geometric plane so as to expand or compress the divergence of the incoming light. The inclination of the control surface 23, and possibly its curvature (which may be of any non-planar shape), in the transverse direction of the panel 4 may thus be designed to confine the light to a desired range of reflection angles ($\Delta\theta_p$) inside the panel 4. Again it should be remembered that the limits of the range of reflection angles are defined according to the same criterion as the limits of the device divergence $\alpha_y$ (e.g. $I_{50}$ as indicated in FIG. 4).

The minimum reflection angle $\theta_{p,min}$ (FIG. 8) may be set to exceed the critical angle. This may minimize the leakage of light through the top boundary surface 5. The maximum bounce angle $\theta_{p,max}$ may be set with respect to a sensitivity criterion for the touch interaction. For example, it may be desirable to confine the light to such internal reflection angles that interact significantly with the touching objects, i.e. reflection angles with significant frustration of the total internal reflection.

It is to be understood that the design of the incoupling element 14 needs to take any refraction between the exit face 22 and the panel 4 into account, e.g. refraction caused by a difference in index of refraction. Such refraction is e.g. seen in FIG. 8. Thus, the control surface 23 is designed to generate a component divergence $\theta_c$, which in turn results in the desired range of reflection angles ($\Delta\theta_p$) inside the panel 4.

FIGS. 9A-9B is a top plan view and a section view, respectively, of the coupling element 14 according to the first embodiment, which is designed starting from a cone. The section view is taken along the symmetry line B-B in FIG. 9A. Solid lines designate the contours of the coupling element 14, and dashed lines indicate portions of the cone that have been "cut away" when designing the coupling element 14. It should be emphasized that these sections are generally cut away in the design process, not in the actual manufacturing of the coupling element 14. The cone is defined by a directrix D which defines the base of the cone and a generatrix G which extends between the vertex V and the directrix D. Thus, the generatrix G is "swept" along the directrix D to generate the lateral surface of the cone. The planar base of the cone forms the exit face 22 of the coupling element 14, whereas part of the lateral surface forms the control surface 23. The inclination of the control surface 23 is given by the cone angle $\gamma$, and the shape of the control surface 23 is given by the radii a, b of an ellipse (the directrix D). A lateral cut-out portion is designed, by intersecting the cone with a plane with an angle $\delta$ to the center line of the cone, to form the planar entry face 21. The angle $\delta$ may be set to generate a desired refraction of the cone of light generated by the emitter 2 (cf. FIG. 8) and/or for manufacturing purposes, e.g. to provide a draft angle in injection molding. A bottom cut-out portion is designed to form a planar surface 24 facing away from the base. The planar surface 24 may be denoted a "conic section", which is a conventional term for a surface formed by an intersection between a geometric plane and a cone. The conic section 24 (also denoted "bottom surface" and "pick-up surface"), which may be omitted, may be implemented to facilitate gripping of the coupling element 14 during mounting of coupling element 14 to the panel 4. The pick-up surface 24 may, but need not, be parallel to the base. FIGS. 9A-9B indicate various parameters that may be collectively optimized when designing the coupling element 14 for a specific emitter 2 to achieve desired properties of the light coupling into the panel 4. These parameters include the angle $\delta$, the radii a, b, the cone angle $\gamma$, as well as the distance s from the exit surface 22 to the entry point of the optical axis OA on the entry face 21, the height h, the spacing d between the entry point and the emitter 2, and the distance c from the axis of the cone to the entry point. The optical axis OA of the coupling element 14 is the light path that defines the nominal reflection angle $\theta_p$ and the nominal main direction $z_p$ in the panel 4.

The outer surface of the coupling element 14 is partially coated by a reflective material, at least on the portion of the lateral surface that is internally illuminated by the cone of light from the emitter 2.

Figure 10A:
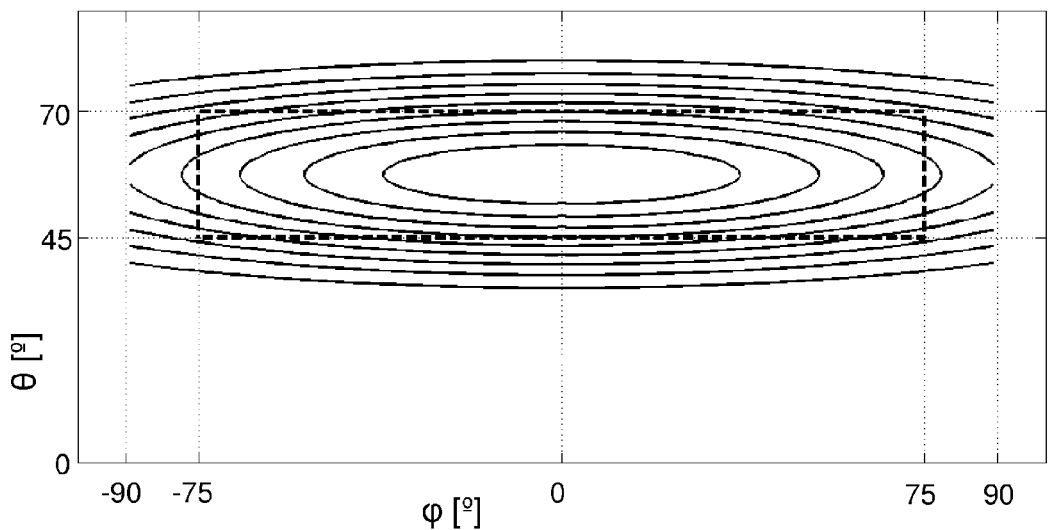
FIG. 10A is a contour plot of a light intensity distribution generated by a coupling element according to the first embodiment, and FIG. 10B defines the angles used in FIG. 10A.
Figure 10B:
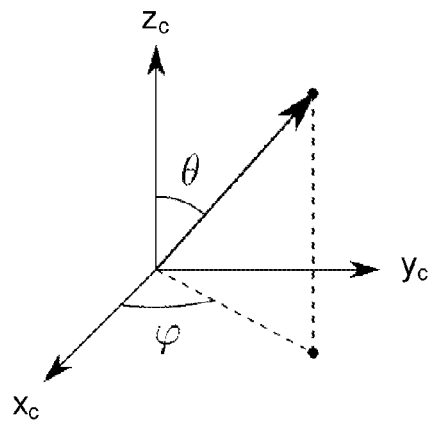

It is possible to optimize the design of the coupling element 14 such that the light at the exit surface 22 has an essentially rectangular distribution of intensity with respect to an elevation angle $\theta$ and an azimuth angle $\phi$. FIG. 10A is a plot of such a light distribution at the exit face 23 of the coupling element 14, with respect to the angles $\theta$, $\phi$. FIG. 10B illustrates the definition of the elevation and azimuth angles $\theta$, $\phi$ in relation to the coordinate system in FIG. 6. The illustrated light distribution is illustrated for a coupling element 14 designed for a Lambertian emitter placed with a spacing from the entry face 21. In this example, the distribution is essentially symmetric with respect to the main direction ($\phi=0°$), and the outer limits at 50% of maximum intensity are approximately located at $\phi=\pm75°$ (i.e. $\phi_c=150°$). It is also seen that the distribution is essentially symmetric with respect to $\theta=57.5°$ and that the outer limits at 50% of maximum intensity are approximately located within 45°-70° (i.e. $\theta_c=25°$). The angle $\theta=57.5°$ sets the nominal reflection angle $\theta_p$ inside the panel, and the component divergence $\theta_c$ sets the range of reflection angles $\Delta\theta_p$ around the nominal reflection angle $\theta_p$. Thus, as illustrated by the dashed rectangle in FIG. 10A, the coupling element defines as essentially rectangular distribution of light in the ($\theta$, $\phi$)-plane.

The rectangular distribution in FIG. 10A means that the component divergence $\theta_c$ is essentially invariant as a function of the component divergence $\phi_c$. Thereby, the injected light will propagate similarly in all directions away from the incoupling site (i.e. for all $\phi$) within the panel divergence $\phi_p$ (cf. FIG. 5), which may be desirable for achieving a consistent interaction across the panel 4, i.e. that the light that impinges on a touching object from within the panel 4 has approximately the same intensity distribution as function of angle of incidence across the panel. In other words, the touching object is illuminated in approximately the same way across the entire touch surface, which results in approximately the same interaction between the touching object and the light across the touch surface.

Figure 11:
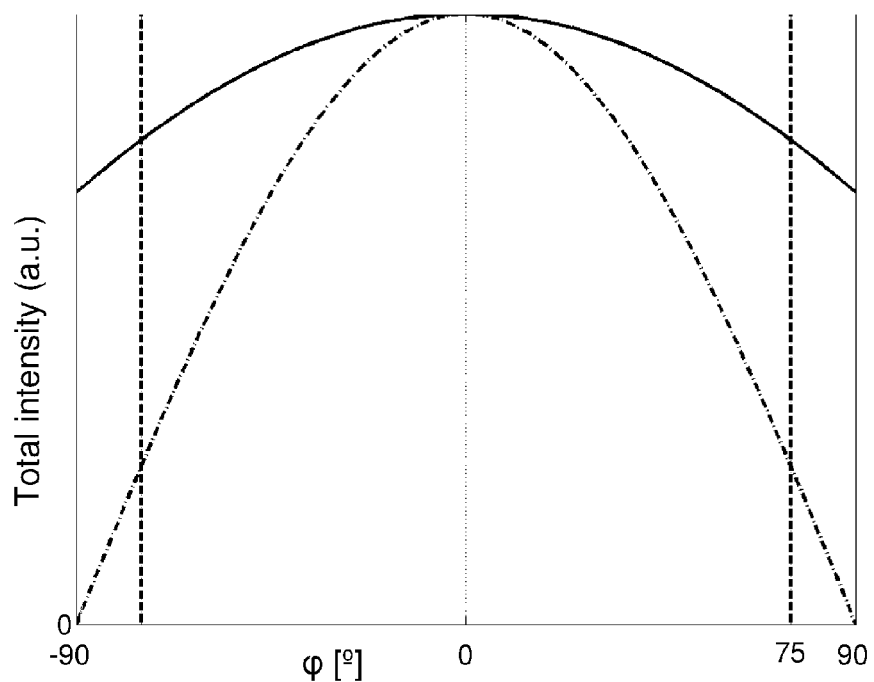
FIG. 11 is a graph of the total intensity inside the panel as a function of angle with respect to the main propagation direction of the light from the incoupling site, obtained with and without a coupling element of the first embodiment.

FIG. 11 is a plot of total intensity as a function of azimuth angle $\phi$ (solid line), which may be obtained by a summation of the data in FIG. 10A in the θ direction. For comparison, FIG. 11 also includes a corresponding intensity profile (dashed line) obtained for a fictive Lambertian emitter directly attached to the peripheral edge surface of the panel 4 (similarly to sensor 3 in FIG. 2A). As shown, the coupling element 14 operates to both increase the overall intensity and improve the uniformity of the generated light in the plane of the panel 4, i.e. within the panel divergence $\phi_p$.

The above-described design principles are equally applicable when designing a coupling element for transferring the light from the panel onto a light detector. For example, in the context of FIGS. 6-9, the base of the cone (i.e. the attachment surface 22) will form a light entry face, the reflective portion of the lateral surface will form the control surface, and the lateral cut-out portion will form the light exit surface, which may be spaced from the light detector by an air gap. The above-described cone of light corresponds to a field of view of the detector, where the field of view may be defined by the same criterion as the cone of light (e.g. 50% of maximum intensity), and the device angles $\alpha_x$, $\alpha_y$ (FIG. 3) corresponds to viewing angles in two mutually orthogonal planes. In analogy with the incoupling element described in the foregoing, the outcoupling element will expand the device angle $\alpha_x$ into a component divergence or view angle $\phi_c$ at the light entry face, and orient (and possibly expand/compress) the device angle $\alpha_y$ into a component divergence or view angle $\theta_c$ at the light entry face.

Reverting to FIG. 2, such outcoupling elements may be used for coupling the light out of the panel 4 for receipt by the light detectors 3. The outcoupling elements may be attached to either of the boundary surfaces 5, 6. These outcoupling elements may be designed in complete analogy with the incoupling elements as described in the foregoing, except that the light emitters 2 are replaced by light detectors 3. Depending on implementation, it may be desirable to make the outcoupling elements larger than the incoupling elements, in order to allow the detector to have a larger light-sensitive surface area to receive the light from the exit face of the outcoupling element. This may e.g. increase the signal-to-noise ratio (SNR) of the output signal. In one implementation, the incoupling elements and the outcoupling elements have a width in the $y_c$ direction (FIG. 6) of about 3-7 mm and about 5-10 mm, respectively.

Figure 12:
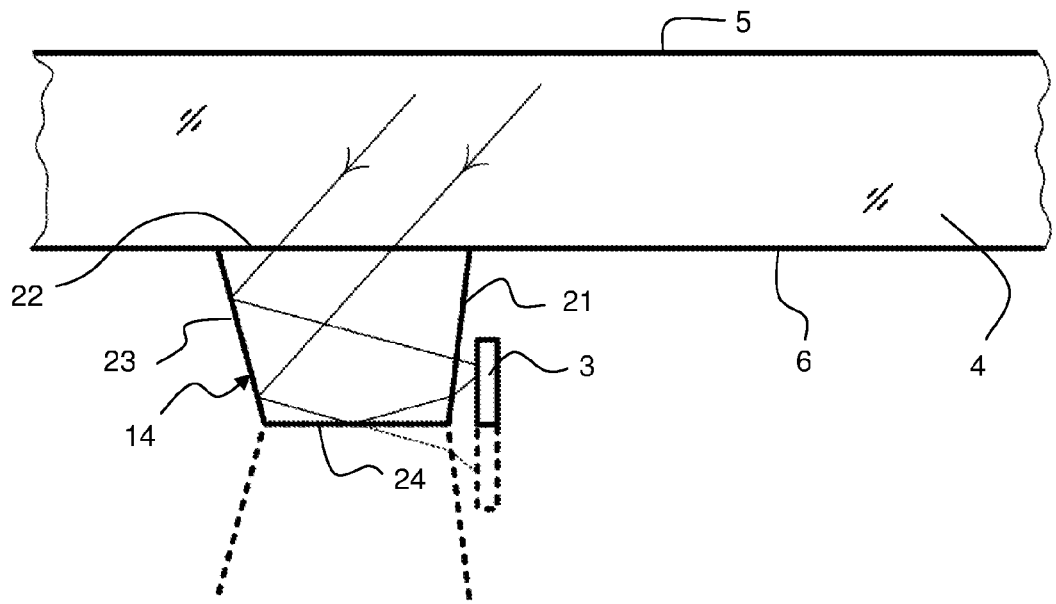
FIGS. 12-13 are section views of variants of the coupling element according to the first embodiment, as attached to a panel.

In a variant of the outcoupling element, the pick-up surface 24 may be made reflective, e.g. by applying a reflective coating on the outside of the pick-up surface 24. FIG. 12 is a section view of such an outcoupling element 14 and illustrates how light rays are reflected in the pick-up surface 24 onto the detector 3. The dotted lines in FIG. 12 illustrate that the effective light-sensitive surface area of the detector 3 may be increased by the reflections in the pick-up surface 24 causing more light to be directed onto the detector. A corresponding advantage may be obtained by a reflective pick-up surface in an incoupling element 14, where the pick-up surface 24 may be designed relative to the cone of light so as to increase the amount of light coupled into the panel 4 and/or modify the distribution of light within the range of reflection angles in the panel 4.

Figure 13:
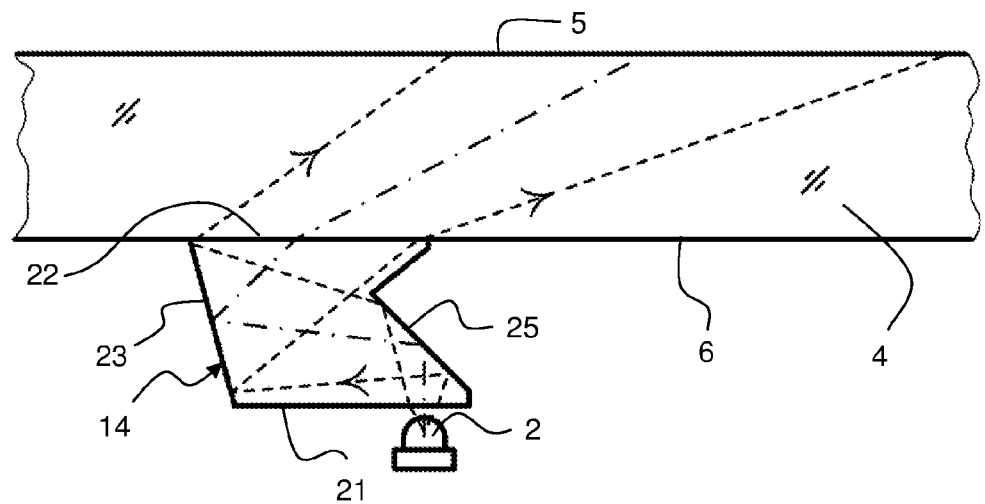

FIG. 13 is a side view of another variant of the incoupling element 14 described in the foregoing. In this variant, the incoupling element 14 includes a reflective folding surface 25 that defines a folded beam path from the entry face 21 which is arranged to be parallel with the attachment surface 22. It should be noted that the folding surface 25 in FIG. 13 may be planar to merely redirect the incoming cone of light onto the control surface 23. Alternatively, the folding surface 25 may have a shape that modifies the distribution of the incoming cone of light. The coupling element 14 in FIG. 13 may also be used in coupling light out of the panel 4.

The embodiment in FIG. 13, and alternative configurations that allow the light emitter 2 to be arranged beneath the incoupling element 14 as seen from the panel 4, has certain attractive properties. For one, the thickness of the touch-sensitive apparatus may be reduced, e.g. if the emitter 2 is attached to a PCB (e.g. 15 in FIG. 2), since the PCB may be arranged parallel with the panel 4. Further, a group of incoupling elements 14 may be arranged to operate on the cone of light from a single emitter 2, whereby each incoupling element 14 operates to couple a separate portion of the cone of light into the panel 4. The incoupling elements within such a group may (but need not) be mutually identical. Corresponding advantages and effects may be obtained if the incoupling element 14 in FIG. 13 (including equivalent structures) is used and designed for coupling light out of the panel.

In the description above, it is presumed that the control surface 23 is provided with a reflective coating. However, it is conceivable that the reflection(s) in the control surface 23 occurs via total internal reflection in the coupling element 14, be it used for incoupling or outcoupling, provided that the coupling element 14 is designed to ensure that light hits the control surface 23 at an angle that exceeds the critical angle.

Figure 14:
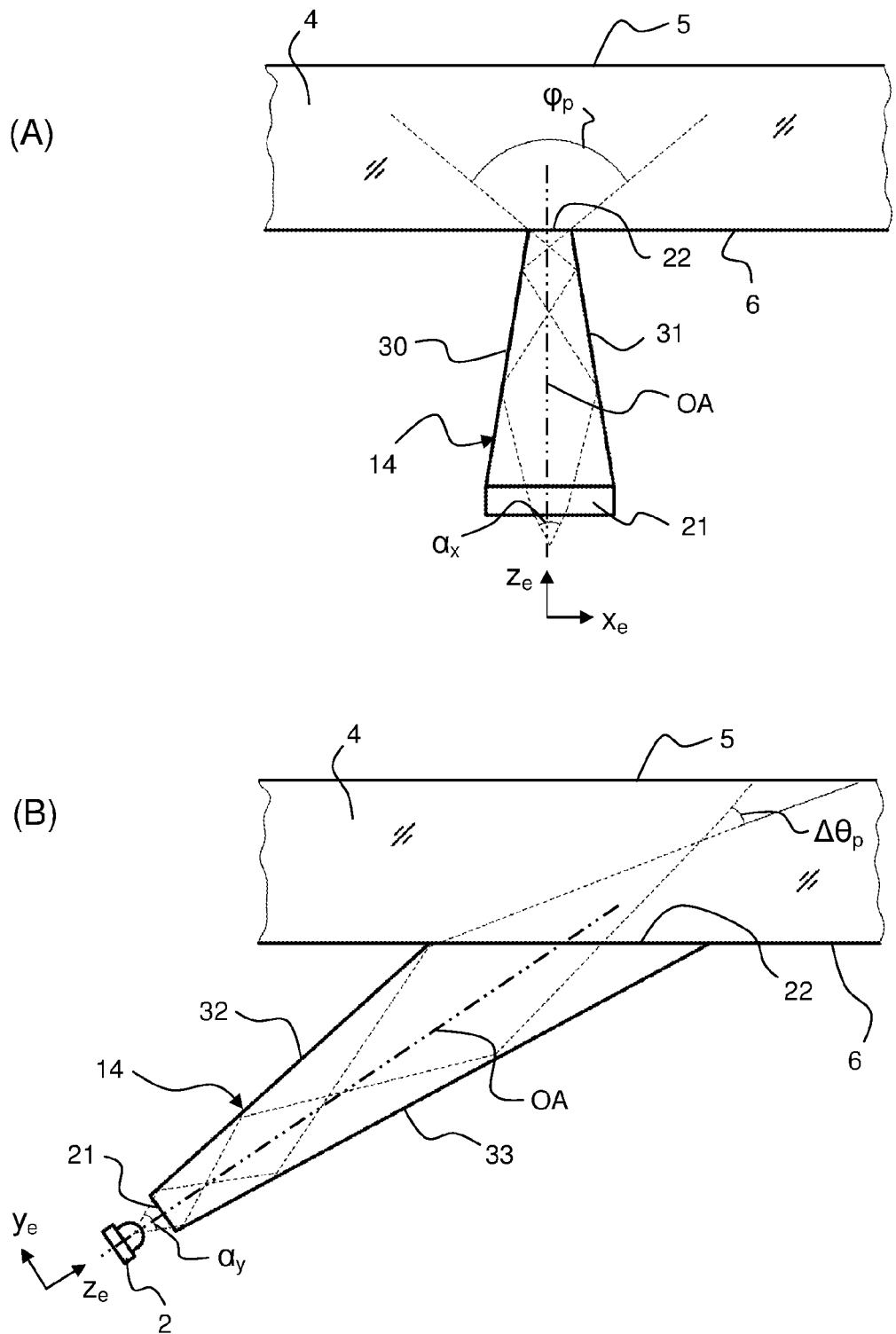
FIGS. 14A-14B are elevated side views of a coupling element according to a second embodiment, as attached to a panel.

FIGS. 14A-14B are elevated side views, taken from mutually orthogonal sides, of an incoupling element 14 according to a second embodiment. The incoupling element 14, which is attached to the bottom boundary surface 6 of the panel 4, is designed as an elongate light guide of light transmissive material that defines an entry face 21 at one end and an exit face 22 at the other end. The light guide 14 comprises a first pair of elongate opposing control surfaces 30, 31 that expand the emitter divergence $\alpha_x$ into a component divergence $\phi_c$ at the exit face 22, resulting in a desired panel divergence $\phi_p$ inside the panel 4. As shown in FIG. 14A, the control surfaces 30, 31 taper from the entry face 21 to the exit face 22, as seen in a first geometric plane which extends along the light guide 14 and coincides with the $x_e$-$z_e$-plane of the emitter. Thereby, the reflection angle of the light propagating between the control surfaces 30, 31 is decreased for every reflection inside the light guide 14, whereby the light is caused to leave the exit face 22 at an increased divergence.

As shown in FIG. 14B, the exit face 22 is inclined with respect to a center line or optical axis OA of the light guide 14, as seen in a second geometric plane which extends along the light guide 14 and coincides with the $y_e$-$z_e$-plane of the emitter. Thereby, the optical axis OA has a given inclination to the panel 4 when the light guide 14 is attached thereto. The inclination defines the nominal bounce angle $\theta_p$ inside the panel. The light guide 14 also comprises a second pair of elongate opposing control surfaces 32, 33 that control the component divergence $\theta_c$ at the exit face 22. In the illustrated example, the control surfaces flare 32, 33 from the entry face 21 to the exit face 22, in order to confine the emitter divergence $\alpha_y$ to a desired range of reflection angles $\Delta\theta_p$ inside the panel 4. In other variants, depending on the emitter divergence $\alpha_y$, in relation to the desired range of reflection angles $\Delta\theta_p$, the control surfaces 32, 33 may be parallel or tapering towards the exit face 22.

The light guide 14 is at least partially coated by a reflective material. However, it is possible that certain parts of one or more control surfaces 30, 31, 32, 33 may be uncoated, provided that the guided light undergoes total internal reflection in these parts.

The second embodiment may also be designed as an outcoupling element for transferring the light from the panel onto a light detector.

Figure 15:
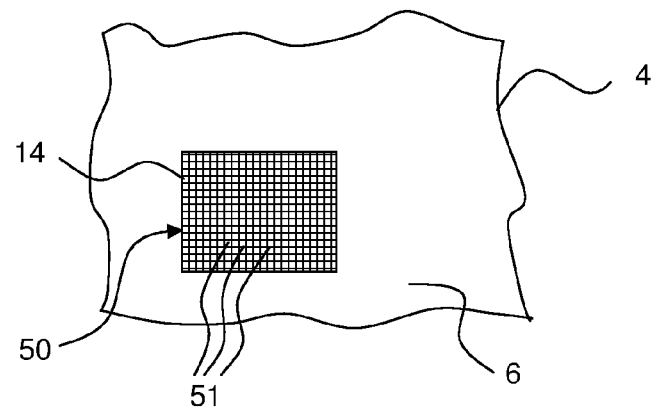
FIG. 15 is a plan view of a part of a panel with a coupling element implemented as a microstructured surface portion.

In yet another alternative, schematically depicted in plan view in FIG. 15, one or more coupling elements 14 are defined by a sheet-like micro-structured surface portion 50 which is fixedly arranged on one of boundary surfaces (6 in FIG. 15). As used herein, a "microstructured surface" contains surface structures having at least one dimension in the range of 0.1-1000 μm. For example, the microstructured surface portion 50 may comprise a plurality of microreplicated prismatic elements 51 that collectively form one or more coupling elements 14. In one such embodiment, each prismatic element 51 has a design similar to the coupling elements described in the foregoing, whereby each prismatic element operates on a small part of the operative solid angle of the associated electro-optical device. In another embodiment, the coupling element 14 is implemented by a microstructured surface portion 50 defining a Fresnel lens or a diffractive optical element (DOE), which both are compact and well-proven components that may be designed with desired re-directing and re-shaping properties. The diffractive optical component (DOE) may be a grating, such as a holographic grating. The microstructured surface portion 50 may have an essentially flat configuration on the boundary surface, e.g. projecting 1 mm or less from the boundary surface. It is to be understood that that the microstructured surface portion 50 may be either integrated in the boundary surface 5, 6 or provided on a substrate, such as a thin film, with an adhesive backing for attachment to the boundary surface 5, 6.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, although the boundary surfaces have been illustrated as external surfaces of the panel, it is conceivable that one of the boundary surfaces is formed by an internal interface in the panel, e.g. a reflective layer or a step change in index of refraction, against which the light is reflected as is propagates through the panel.

In all embodiments, the entry face of the incoupling element and the exit face of the outcoupling element may be designed to refract the transmitted light, e.g. by means of a curvature or inclination of the entry/exit face, so as to modify the transmitted cone of light in any direction.

For avoidance of doubt, it should be emphasized that the inventive incoupling elements may, but need not, be used in combination with the inventive outcoupling elements. Thus, the touch-sensitive apparatus may include at least one of the inventive incoupling and outcoupling elements.

It is also to be understood that FIG. 2 merely illustrates one example of a fan beam based FTIR system. The inventive coupling elements may be used in other types of FTIR systems as well, including any of the systems referenced in the Background section. Generally, the inventive incoupling element may be used in all types of touch systems that operate by generating fan beams that propagate by internal reflections in a light transmissive panel, and the inventive outcoupling element may be used in all types of touch systems that operate by locally coupling light out of a light transmissive panel.

The invention claimed is:

1. An optical component for transferring light between an electro-optical device and a light transmissive panel which defines two opposing boundary surfaces, the electro-optical device having an operative solid angle-given by first and second device divergence angles in orthogonal first and second device planes, wherein the optical component comprises:
a first light transmission surface configured to face the electro-optical device,
a second light transmission surface configured to face and be affixed to one of the boundary surfaces, and
a control surface arrangement configured to direct the light between the first and second light transmission surfaces by one or more reflections to expand the first device divergence angle of the light received through the first light transmission surface into a first component divergence angle at the second light transmission surface, the first component divergence angle being arranged to define, with respect to light propagating by internal reflections inside the light transmissive panel, a divergence inside the light transmissive panel in a direction parallel to the boundary surfaces; wherein
the first component divergence angle of the light is greater than the first device divergence angle of the light.

2. The optical component of claim 1, wherein the control surface arrangement is further configured to convert the second device divergence angle into a second component divergence angle at the second light transmission surface, the second component divergence angle defining a confined range of angles of incidence inside the light transmissive panel with respect to the boundary surfaces.

3. The optical component of claim 2, wherein the first component divergence angle represents a divergence in an azimuth angle with respect to the second light transmissive surface, and the second component divergence angle represents a divergence in an elevation angle with respect to the second light transmissive surface, and wherein the second component divergence angle is essentially the same for all azimuth angles within the first component divergence angle.

4. The optical component of claim 2, wherein said confined range of angles of incidence inside the light transmissive panel extends from a minimum angle to a maximum angle, given relative to a normal of the boundary surfaces, and wherein the minimum angle is in the approximate range of 42°-54° and the maximum angle is in the approximate range of 56°-85°.

5. The optical component of claim 4, wherein the minimum angle is selected to exceed a critical angle for total internal reflection inside the light transmissive panel.

6. The optical component of claim 2, wherein the control surface arrangement comprises a three-dimensional control surface which is configured to reflect the light and which comprises a first and a second two-dimensional shape feature that at least partly defines the first and second component divergence angle, respectively.

7. The optical component of claim 6, wherein the first two-dimensional shape feature is a peripheral curvature in a first geometric plane and the second two-dimensional shape feature is an inclination with respect to a second geometric plane orthogonal to the first geometric plane.

8. The optical component of claim 7, wherein the three-dimensional control surface further comprises a curvature in a third geometric plane orthogonal to the first and second geometric planes.

9. The optical component of claim 7, wherein the first geometric plane is parallel to the second light transmission surface.

10. The optical component of claim 7, wherein the control surface has an extent in a projection direction away from the second light transmission surface, and wherein the peripheral curvature is essentially invariant in the projection direction.

11. The optical component of claim 7, wherein the peripheral curvature is part of an ellipse.

12. The optical component of claim 11, wherein the first device divergence angle has a point of origin which is given an optical placement relative to a focal point of the ellipse to generate the first component divergence angle.

13. The optical component of claim 6, in which the control surface arrangement is based on a cone defined by a directrix generating a base, a vertex, and a generatrix generating a lateral surface, wherein the second light transmission surface is formed by at least part of the base, and the three-dimensional control surface is formed by at least part of the lateral surface.

14. The optical component of claim 13, wherein the control surface arrangement further comprises a conic section formed in the lateral surface to extend parallel to the base.

15. The optical component of claim 14, wherein the conic section is provided with a reflective coating.

16. The optical component of claim 1, wherein the optical component is spaced from the electro-optical device by an air gap between the first light transmission surface and the electro-optical device.

17. The optical component of claim 1, wherein said divergence inside the light transmissive panel spans at least 100°, 120°, 140°, 160° or 170°.

18. An optical film for transferring light between one or more electro-optical devices and a light transmissive panel which defines two opposing boundary surfaces, each electro-optical device having an operative solid angle given by first and second device divergence angles in orthogonal first and second device planes, wherein the optical film is adapted for attachment to one of the boundary surfaces and comprises a micro-structured surface portion that implements at least one optical component as set forth in claim 1.

19. A touch-sensitive apparatus, comprising:
a light transmissive panel which defines two opposing boundary surfaces;
an illumination arrangement configured to couple light into the light transmissive panel such that the light propagates by total internal reflection in at least one of the boundary surfaces and such that an object touching said at least one of the boundary surfaces causes a change in the propagating light;
a detection arrangement comprising a light detector arranged to detect said change in the propagating light;
wherein at least one of the illumination arrangement and the detection arrangement comprises at least one electro-optical device having an operative solid angle given by first and second device divergence angles in orthogonal first and second device planes, and at least one optical component as set forth in claim 1.

20. An optical component for transferring light between an electro-optical device and a light transmissive panel which defines two opposing boundary surfaces, wherein the optical component comprises:
a light transmissive surface and a control surface arrangement which is based on a cone defined by a directrix generating a base, a vertex, and a generatrix generating a lateral surface, wherein
the optical component is operable to transfer light by mounting the base to one of the boundary surfaces and arranging the electro-optical device to face the light transmissive surface, such that the light is transferred through the optical component by at least one internal reflection in the lateral surface,
a light transmission surface of the base is configured to face and be affixed to the one of the boundary surfaces,
the directrix is configured such that, when the base is mounted to the light transmissive panel, a first device divergence angle of the electro-optical device in a first device plane parallel to the base corresponds to a divergence inside the light transmissive panel in a direction parallel to the boundary surfaces, and
said divergence inside the light transmissive panel is larger than the first device divergence angle.

21. The optical component of claim 20, wherein the generatrix is configured such that, when the base is mounted to the light transmissive panel, a second device divergence angle of the electro-optical device in a second device plane perpendicular to the first device plane corresponds to a confined range of angles of incidence inside the light transmissive panel with respect to the boundary surfaces.

22. The optical component of claim 20, wherein the electro-optical device is a light source, and wherein the optical component is configured to couple light emitted by the light source into the light transmissive panel for propagation by internal reflections inside the light transmissive panel.

23. The optical component of claim 20, wherein the electro-optical device is a light detector, and wherein the optical component is configured to couple light propagating by internal reflections inside the light transmissive panel out of the light transmissive panel for receipt by the light detector.

* * * * *